United States Patent
Chiang et al.

(10) Patent No.: US 7,142,261 B2
(45) Date of Patent: Nov. 28, 2006

(54) LIQUID CRYSTAL DISPLAY HAVING COMPENSATION CAPACITOR

(75) Inventors: Min-Feng Chiang, Sinjhuang (TW);
Ming-Sheng Lai, Taipei (TW);
Kuo-Hsing Cheng, Taipei (TW);
I-Fang Wang, Changhua (TW);
Yan-Sian Ye, Yonghe (TW)

(73) Assignee: AU Optronics Corporation, Hsinchu (TW)

( * ) Notice: Subject to any disclaimer, the term of this patent is extended or adjusted under 35 U.S.C. 154(b) by 159 days.

(21) Appl. No.: 10/881,829

(22) Filed: Jun. 29, 2004

(65) Prior Publication Data

US 2005/0285983 A1    Dec. 29, 2005

(51) Int. Cl.
*G02F 1/1343* (2006.01)
*H01L 29/04* (2006.01)
(52) U.S. Cl. ............................ 349/38; 349/139; 257/72
(58) Field of Classification Search ............... 349/38, 349/139, 39; 257/72
See application file for complete search history.

(56) References Cited

U.S. PATENT DOCUMENTS

| 5,414,283 | A |   | 5/1995  | den Boer et al. |
|-----------|---|---|---------|-----------------|
| 5,614,427 | A |   | 3/1997  | den Boer et al. |
| 5,659,375 | A | * | 8/1997  | Yamashita et al. ............ 349/38 |
| 5,745,194 | A |   | 4/1998  | Nakashima et al. |
| 5,886,757 | A |   | 3/1999  | Song et al. |
| 6,326,641 | B1 | * | 12/2001 | Choi ............................ 257/57 |
| 6,559,904 | B1 | * | 5/2003  | Kwak et al. .................. 349/43 |
| 6,580,093 | B1 | * | 6/2003  | Chung et al. ................. 257/72 |
| 6,927,807 | B1 | * | 8/2005  | Kim et al. .................... 349/38 |

* cited by examiner

*Primary Examiner*—Toan Ton
(74) *Attorney, Agent, or Firm*—David I. Roche; Baker & McKenzie LLP

(57) ABSTRACT

A liquid crystal display includes a pixel electrode coupled in each of a plurality of pixels, wherein the pixel electrode has a first side along which runs a first data line and a second side along which runs a second data line, and a switch element coupling the pixel electrode with one scan line and the first data line. A conductive layer is connected to any of the first or second data line to form a compensation capacitor coupling between the pixel electrode and the first or second data line. The compensation capacitor balances the capacitive coupling at the two sides of the pixel electrode adjacent to the first and second side of the pixel electrode.

14 Claims, 5 Drawing Sheets

LIQUID CRYSTAL DISPLAY HAVING COMPENSATION CAPACITOR

BACKGROUND OF THE INVENTION

1. Field of the Invention

The present invention generally relates to liquid crystal display technology, and more particularly to the pixel structure of a liquid crystal display having balanced parasitic capacitance.

2. Description of the Related Art

Conventionally, the structure of a thin film transistor liquid crystal display (TFT-LCD) includes a TFT array substrate, a color filter array substrate, and a liquid crystal layer sandwiched between the TFT substrate and the color filter substrate. The TFT substrate conventionally carries an array of thin film transistors, each of which is connected to one pixel electrode. Each thin film transistor operates as a switch element to apply a voltage to the pixel electrode, which thereby creates an electric field in the liquid crystal layer to selectively control the orientation of the liquid crystal molecule director for displaying images.

FIG. 1A is a schematic view of a pixel area in a conventional active matrix liquid crystal display. In the pixel area, a thin film transistor 10 is conventionally coupled with a data line 32 and a scan line 42. The thin film transistor 10 includes a gate electrode 12 connected to the scan line 42, a source electrode 14 connected to the data line 32 and a drain electrode 16 connected to a pixel electrode 50. The source electrode 14 and drain electrode 16 are formed over a semiconductor layer 6. Another data line 34 runs along a side of the pixel electrode 50 opposite to the side of the coupled data line 32.

FIG. 1B is a cross-sectional view taken along section 1B in FIG. 1A. The pixel structure including the thin film transistor 10 is usually formed over a substrate 2. The data lines 32, 34 are formed on a gate-insulating layer 4 covering the gate electrode 12. The pixel electrode 50 is formed on a dielectric layer 8 that covers the substrate 2, including the thin film transistor 10 and the data lines 32, 34. In this conventional pixel structure, the proximity of the data lines 32, 34 at two sides of the pixel electrode 50 produces a parasitic capacitance. Since the pixel electrode 50 has two capacitive coupling sides of different length, the resulting capacitive coupling ($C_{pd1}$, $C_{pd2}$) with the data line 32, 34 conventionally differs at the two sides of the pixel electrode 50, i.e. $C_{pd1} \neq C_{pd2}$. This differential parasitic capacitance results in a fluctuation of the operating voltage of the pixel electrode 20, which generally causes pixel flickering and cross talk effects.

To solve the problems of parasitic capacitance in pixel structures, many technical approaches are known in the art.

FIG. 1C illustrates a conventional pixel structure configured to reduce the parasitic capacitance between a light-shield film and the source/drain electrodes of the thin film transistor as described in U.S. Pat. No. 5,745,194, the disclosure of which is incorporated herein by reference. The illustrated thin film transistor is covered with a light-shielding layer 60. A compensation capacitor 40 is further formed in an area overlapping the pixel electrode 50 and the data line 34 uncoupled with the pixel electrode 50 to compensate their mutual capacitive coupling.

U.S. Pat. No. 5,886,757 describes a liquid crystal display having thin film transistors of reduced parasitic capacitance, the disclosure of which is incorporated herein by reference. In this reference, one thin film transistor includes a gate electrode extending from one scan line, a drain electrode connected to a pixel electrode, and a source electrode connected to a data line. The source electrode has a width greater than the width of the drain electrode to reduce a parasitic capacitance of the thin film transistor.

In U.S. Pat. No. 5,614,427, the disclosure of which is also incorporated herein by reference, the drain electrode is configured to completely surround the source electrode of the thin film transistor. This particular geometry enables to reduce the parasitic capacitance of the thin film transistor.

U.S. Pat. No. 5,414,283 also discloses a thin film transistor implemented in a liquid crystal display with reduced parasitic capacitance. In this reference, a thin film transistor includes a central rounded source electrode that is surrounded by an annular or circular drain electrode to reduce the parasitic capacitance.

The aforementioned approaches known of the prior art may bring some solutions to the issue of parasitic capacitance, but are not economical when practically put in implementation. In particular, the design of specific geometry of the thin film transistor requires a high precision patterning process and reduces the window process. As a result, the manufacture cost is increased.

Therefore, there is presently a need for a liquid crystal display that can reduce the undesirable effects caused by the parasitic capacitance in the pixel structure, and be economically put in production without increasing the manufacture cost.

SUMMARY OF THE INVENTION

The application describes a liquid crystal display that can reduce the undesirable effects caused by the occurrence of differential parasitic capacitance in a pixel structure.

In one embodiment, the liquid crystal display comprises a pixel electrode respectively coupled in each of a plurality of pixels, wherein the pixel electrode has a first side along which runs a first data line and a second side along which runs a second data line, and a switch element coupling the pixel electrode with one scan line and the first data line. The first and second data lines include capacitive coupling portions in proximity of the first and second sides of the pixel electrode which are dimensionally configured to balance the capacitive coupling at the first and second sides of the pixel electrode.

In one embodiment, one capacitive coupling portion includes a protrusion laterally projecting from the length of any of the first or second data line. In a variant embodiment, the protrusion of the capacitive coupling portion includes an area overlapped with the pixel electrode. In another variation, the protrusion of the capacitive coupling portion is located outside an area occupied by the pixel electrode.

In an embodiment, one capacitive coupling portion includes at least a recessed area. In a variant embodiment, a first capacitive coupling portion of the first data line includes a protrusion while a second capacitive coupling portion of the second data line includes a recessed area.

The foregoing is a summary and shall not be construed to limit the scope of the claims. The operations and structures disclosed herein may be implemented in a number of ways, and such changes and modifications may be made without departing from this invention and its broader aspects. Other aspects, inventive features, and advantages of the invention, as defined solely by the claims, are described in the non-limiting detailed description set forth below.

BRIEF DESCRIPTION OF THE DRAWINGS

The objects and advantages of the present invention will be apparent from the following detailed description of the embodiments of the invention with reference to the following drawings.

DETAILED DESCRIPTION OF THE EMBODIMENTS

Figure 1A:
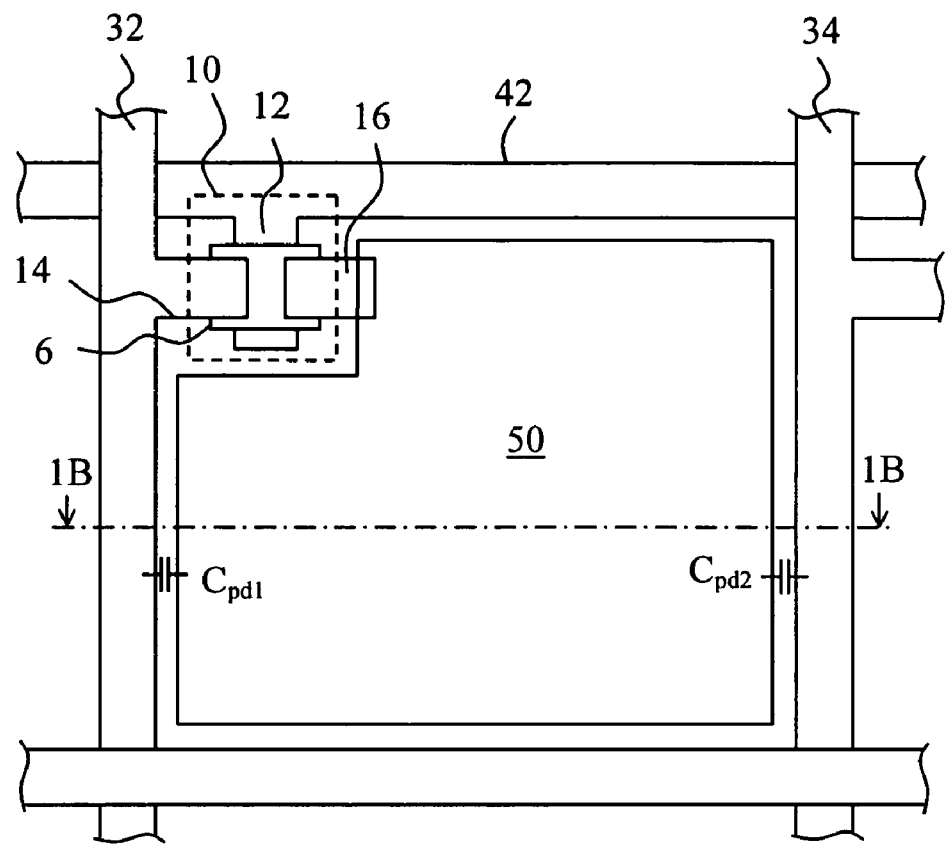
FIG. 1A is a planar view of a pixel area in a conventional active matrix liquid crystal display.
Figure 1B:
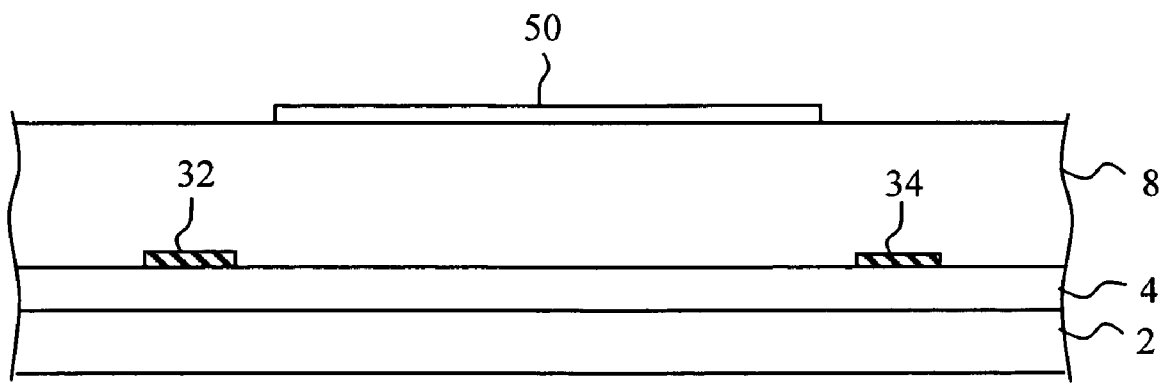
FIG. 1B is a cross-sectional view taken along section 1B in FIG. 1A.
Figure 1C:
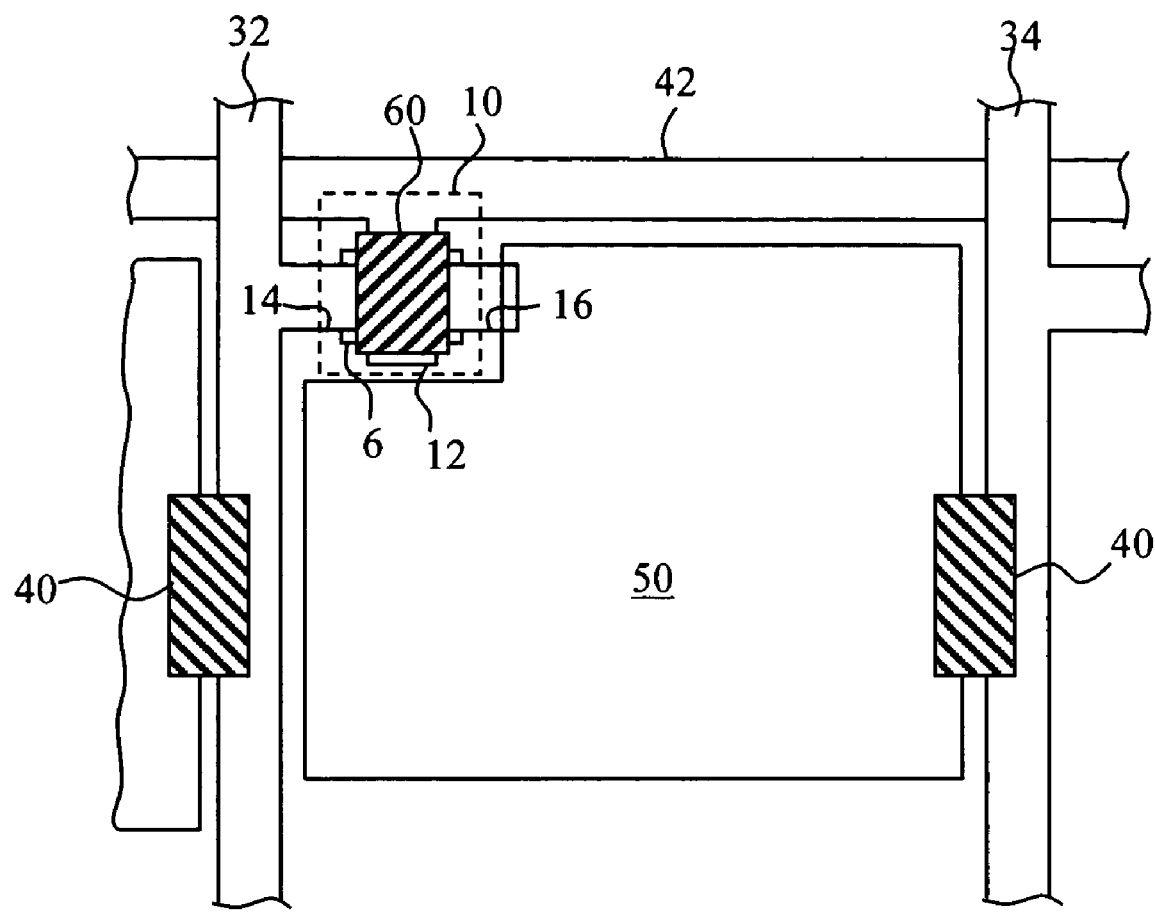
FIG. 1C is a schematic view of another pixel structure having compensated capacitive coupling known in the prior art.
Figure 2A:
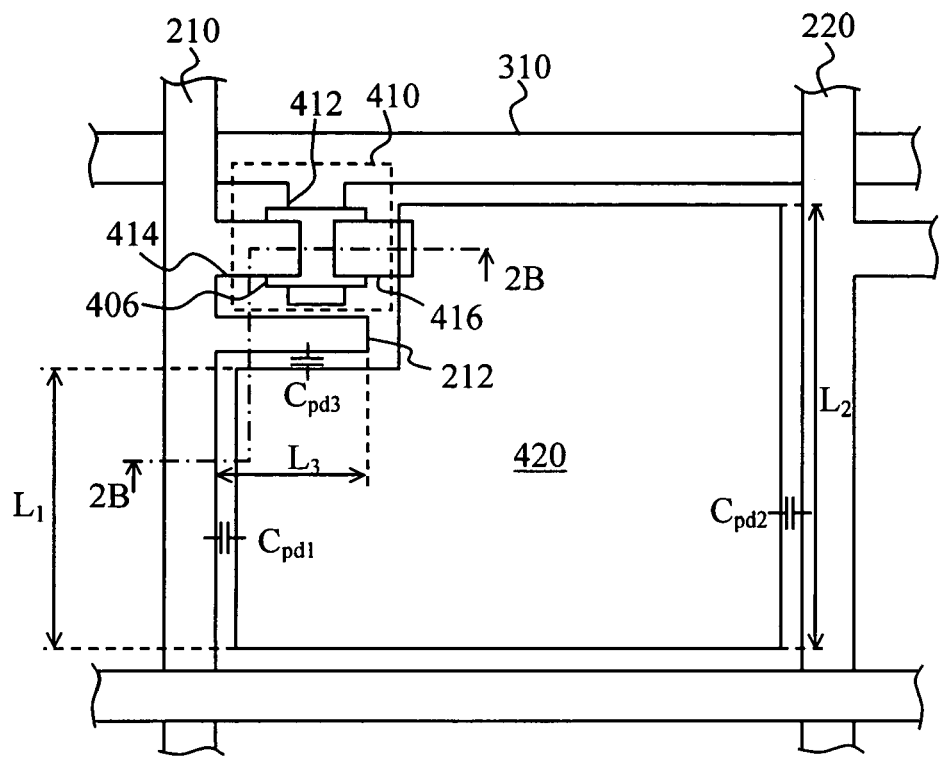
FIG. 2A is a planar view illustrating a pixel area of a liquid crystal display according to an embodiment of the present invention.

FIG. 2A is a planar view illustrating a pixel area of a liquid crystal display according to an embodiment of the present invention. In the pixel area, a switch element 410 such as a thin film transistor couples a pixel electrode 420 with a data line 210 and a scan line 310. The thin film transistor 410 includes a gate electrode 412 coupled with the scan line 310, a source electrode 414 coupled with the data line 210, and a drain electrode 416 coupled with the pixel electrode 420. The data line 210 runs at one side of the pixel electrode 420, while another data line 220 is flanked at another side of the pixel electrode 420 opposite to the data line 210.

Figure 2B:
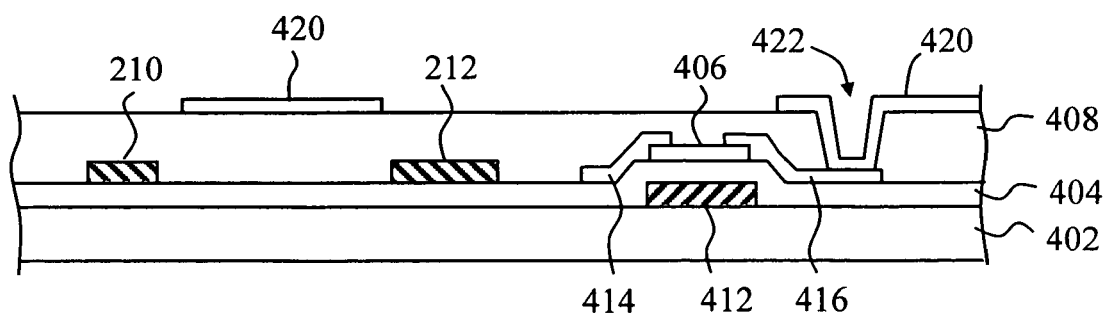
FIG. 2B is a cross-sectional view taken along section 2B in FIG. 2A.

FIG. 2B is a cross-sectional view taken along section 2B in FIG. 2A. The thin film transistor 410 is formed over a transparent substrate 402. The gate electrode 412 is formed over the substrate 402, and can exemplary have a thickness between about 1000 Å and 5000 Å. The scan line 310 can be formed along with the gate electrode 412. Material suitable for the gate electrode 412 and the scan line 310 can include chromium (Cr), aluminum (Al), tantalum (Ta), or combinations thereof. A gate-insulating layer 404 is formed to cover the gate electrode 412. The gate-insulating layer 404 can have a thickness between about 3000 Å and 4000 Å. The gate-insulating layer 404 can be made of silicon oxide ($SiO_x$), silicon nitride ($SiN_x$), tantalum oxide, or the like.

A semiconductor layer 406 is formed on the gate-insulating layer 404 to cover the area of the gate electrode 412. In an embodiment, the semiconductor layer 406 can be made of amorphous silicon. The source, drain electrodes 414, 416 are formed to partially cover the semiconductor layer 406 at two sides of the gate electrode 412. The source electrode 414 connects to the data line 210 formed on the gate-insulating layer 404.

In the illustrated embodiment, the data line 210 includes a portion 212 laid in an area between the thin film transistor 410 and the pixel electrode 420. A passivation layer 408 is formed to cover the thin film transistor 410 and the data line 210. The pixel electrode 420 is formed on the surface of the passivation layer 408 and connects to the drain electrode 416 via a contact hole 422. The pixel electrode 420 can be made of transparent conductive material such as indium tin oxide, indium zinc oxide, or the like.

As illustrated in FIG. 2A, a length $L_1$ of the data line 210 adjacent to a first side of the pixel electrode 420 forms a parasitic capacitor $C_{pd1}$ while a length $L_2$ of the data line 220 adjacent to a second side of the pixel electrode 420 forms a second parasitic capacitor $C_{pd2}$ having a capacitance different from $C_{pd1}$. The portion 212 of the data line 210 extends with a length $L_3$ to form a compensation capacitor $C_{pd3}$ coupled between the data line 210 and the pixel electrode 420. The compensation capacitor $C_{pd3}$ balances the capacitive coupling at the two sides of the pixel electrode 420, i.e. $C_{pd2} \cong C_{pd1} + C_{pd3}$. As a result, the operating voltage of the pixel electrode 420 can be stabilized to prevent undesirable effects such as pixel flickering or image retention.

Figure 2C:
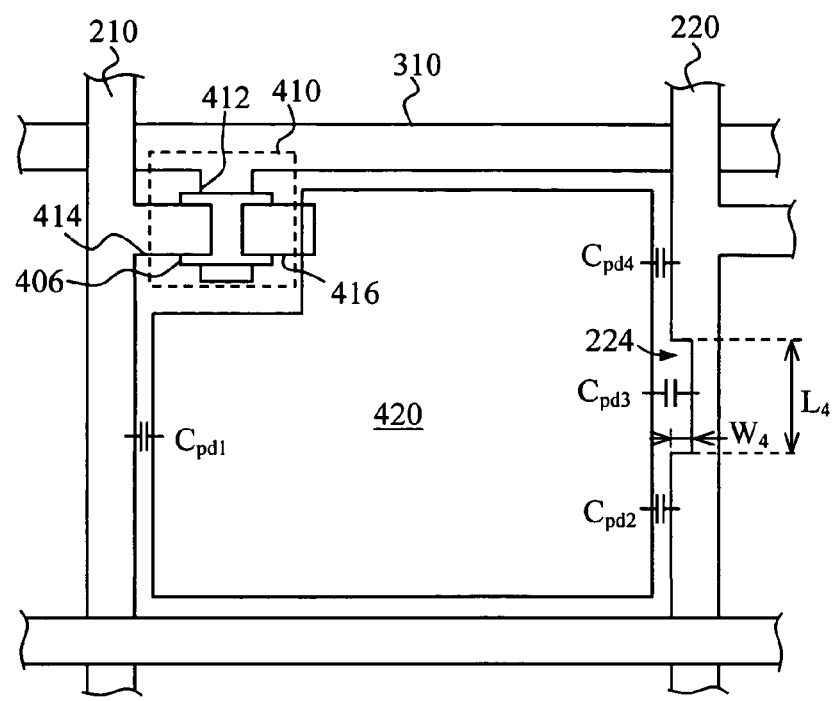
FIG. 2C is a planar view of a pixel implemented with a variant capacitance compensation structure including a recessed portion in a data line according to an embodiment of the invention.

FIG. 2C is a schematic view of a variant embodiment in which the parasitic capacitances at the two sides of the pixel electrode 420 are mutually balanced by forming at least one recess 224 in the data line 220. The recess 224 locally reduces the width of the data line 220. In particular, the length $L_4$ and width $W_4$ of the recess 224 are controlled so that the created coupling capacitors $C_{pd2}$, $C_{pd3}$ and $C_{pd4}$ of the data line 220 are adequately dimensioned to balance with the coupling capacitor $C_{pd1}$ of the data line 210, i.e. $C_{pd1} \cong C_{pd2} + C_{pd3} + C_{pd4}$.

Figure 2D:
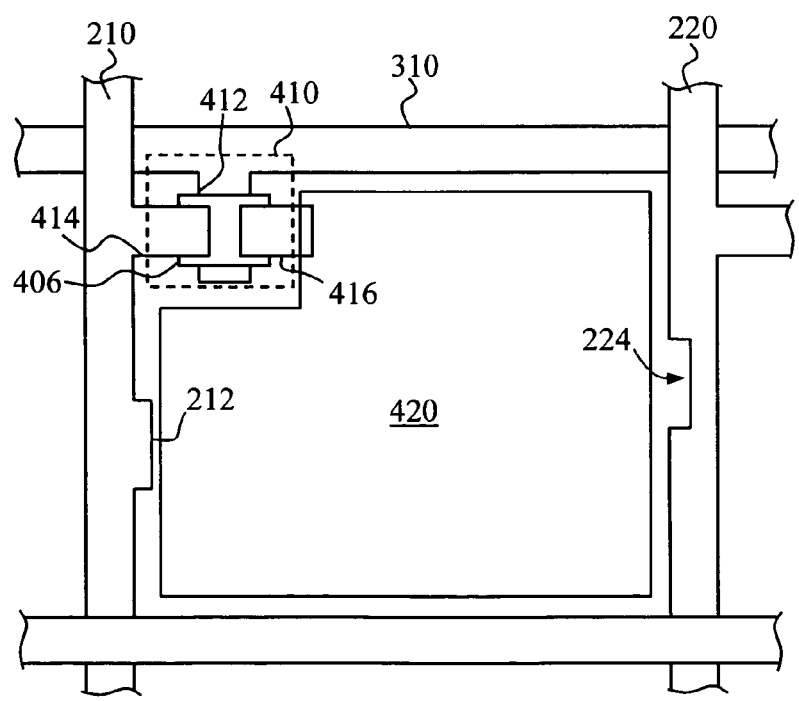
FIG. 2D is a planar view of a pixel implemented with a capacitance compensation structure combining protruding and recessed portions of data lines according to a variant embodiment of the invention.

As shown in FIG. 2D, another variant embodiment can combine a protruding portion 212 on the data line 210 and a recess 224 on the data line 220. The protruding portion 212 and recess 224 enable to dimensionally configure the respective capacitive coupling portions of the data line 210, 220, and thereby obtain balanced parasitic capacitance at the two sides of the pixel electrode 420.

Figure 3A:
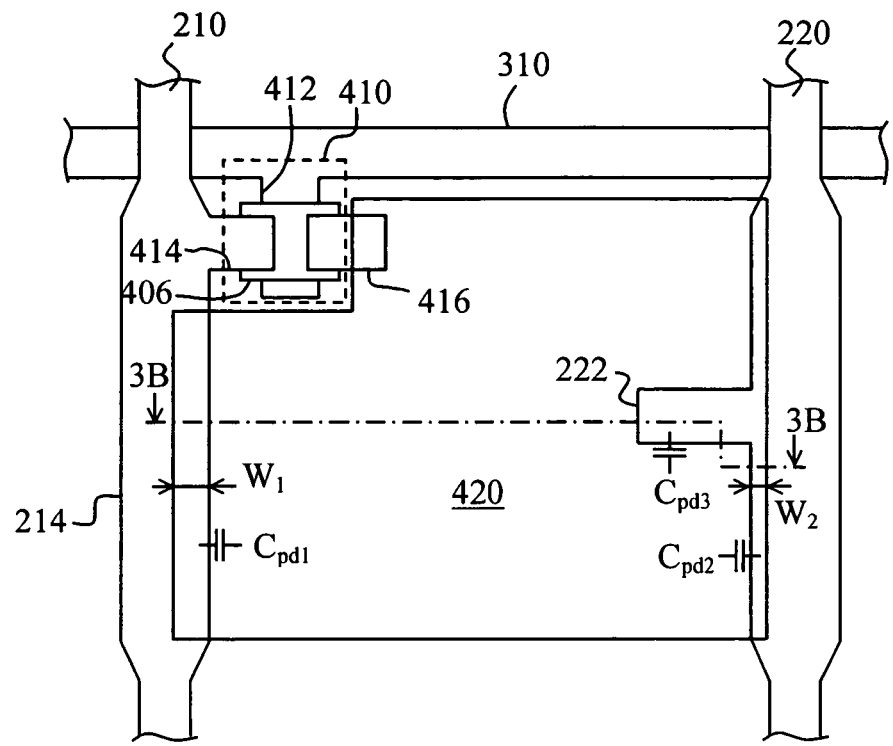
FIG. 3A is a planar view illustrating a pixel area of a liquid crystal display according to further embodiment of the present invention.

FIG. 3A is a planar view illustrating one pixel area of a liquid crystal display according to further embodiment of the present invention. In this variation, the pixel electrode 420 overlaps an area 214 of the data line 210, the overlapping area having a width $W_1$. The area 214 of the data line 210 is formed with a relatively larger width. The data line 220 uncoupled with the pixel electrode 420 has an overlapping area of a width $W_2$ smaller than the overlapping width $W_1$. Notwithstanding, in other embodiments not illustrated, no overlapping area may be set between the data line 220 and the pixel electrode 420.

Figure 3B:
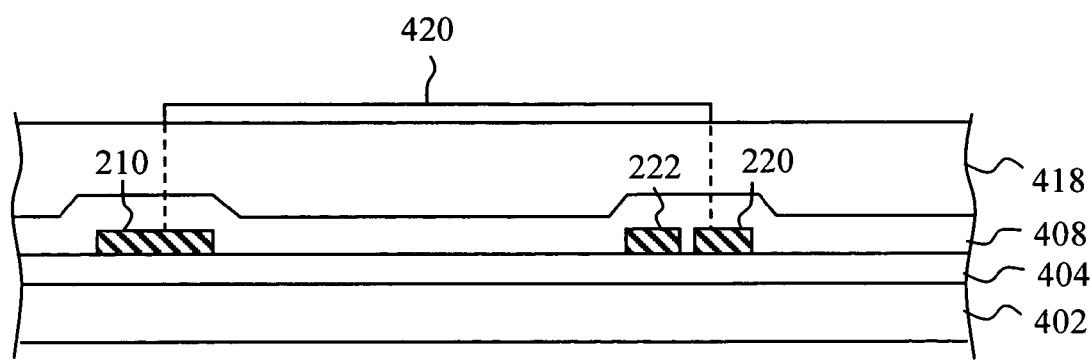
FIG. 3B is a cross-sectional view taken along section 3B in FIG. 3A.

FIG. 3B is a cross-sectional view taken along section 3B in FIG. 3A. The data line 220 includes a portion 222 extending underneath the pixel electrode 420. In this variant embodiment, the pixel electrode 420 lies on an organic dielectric layer 418 that covers the pixel area. The overlapping width $W_1$ forms a parasitic capacitor $C_{pd1}$. Meanwhile, a length of the data line 220 forms a parasitic capacitor $C_{pd2}$ the capacitance of which is smaller than $C_{pd1}$. The extending portion 222 creates an overlapping area that forms a compensation capacitor $C_{pd3}$ to balance the differential capacitance of $C_{pd1}$ and $C_{pd2}$ at the two sides of the pixel electrode 420, i.e. $C_{pd1} \cong C_{pd2} + C_{pd3}$.

As described above, the present application describes the arrangement of a compensation capacitor that is coupled between one data line and the pixel electrode. The compensation capacitor is configured to balance the parasitic capacitance between the pixel electrode and the data lines laid at its sides.

In an embodiment, the compensation capacitor can be simply constituted by forming an additional conductive layer pattern along with the formation of the data line. The formation of this additional conductive layer can be achieved by modifying the pattern to transfer over the substrate, which does not increase the manufacture cost. An improved display system of better image quality thereby can be produced at an economical cost.

Realizations in accordance with the present invention therefore have been described in the context of particular embodiments. These embodiments are meant to be illustrative and not limiting. Many variations, modifications, additions, and improvements are possible. Accordingly, plural instances may be provided for components described herein as a single instance. Additionally, structures and functionality presented as discrete components in the exemplary configurations may be implemented as a combined structure or component. These and other variations, modifications, additions, and improvements may fall within the scope of the invention as defined in the claims that follow.

What is claimed is:

1. A liquid crystal display, comprising:
   a plurality of scan lines and data lines formed over a substrate, wherein the scan lines and data lines define an array of pixels;
   a pixel electrode laid over an area and coupled in each pixel, wherein the pixel electrode has a first side along which runs a first data line and a second side along which runs a second data line;
   a switch element coupling the pixel electrode with one scan line and the first data line, wherein the switch element is operable to apply a voltage to the pixel electrode in response to scan and data signals delivered through the scan line and first data line; and
   a compensation capacitor coupled between the pixel electrode and any of the first or second data line;
   wherein the compensation capacitor includes one capacitive coupling portion connected with any of the first or second data line and entirely located outside the area of the pixel electrode, the capacitive coupling portion having a length and a gap distance from the pixel electrode dimensionally configured to compensate a capacitive coupling between the pixel electrode and the first and second data lines.

2. The liquid crystal display of claim 1, wherein the capacitive coupling portion is made of a material including chromium, titanium, tungsten, tantalum, copper, aluminum, molybdenum, or the like.

3. The liquid crystal display of claim 1, wherein the pixel electrode is made of a transparent conductive material including indium tin oxide, indium zinc oxide, or the like.

4. The liquid crystal display of claim 1, wherein the capacitive coupling portion of the compensation capacitor is formed along with the fist dr second data line.

5. The liquid crystal display of claim 1, wherein an organic dielectric layer is interposed between the capacitive coupling portion and the pixel electrode.

6. A liquid crystal display, comprising:
   a plurality of scan lines and data lines formed over a substrate, wherein the scan lines and data lines define an array of pixels;
   a pixel electrode laid over an area and coupled in each pixel, wherein the pixel electrode has a first side along which runs a first data line and a second side along which runs a second data line; and
   a switch element coupling the pixel electrode with one scan line and the first data line, wherein the switch element is operable to apply a voltage to the pixel electrode in response to scan and data signals delivered through the scan line and first data line;
   wherein the first and second data lines include capacitive coupling portions respectively in proximity of the first and second sides of the pixel electrode, the capacitive coupling portions are entirely located outside the area of the pixel electrode and respectively have a length and a gap distance from the pixel electrode which are configured to balance a capacitive coupling between the pixel electrode and the first and second data lines.

7. The liquid crystal display of claim 6, wherein one capacitive coupling portion includes a protrusion laterally projecting from the length of any of the first or second data line.

8. The liquid crystal display of claim 6, wherein an organic dielectric layer is interposed between the capacitive coupling portions and the pixel electrode.

9. The liquid crystal display of claim 7, wherein the capacitive coupling portion is made of a material including chromium, titanium, tungsten, tantalum, copper, aluminum, molybdenum, or the like.

10. The liquid crystal display of claim 6, wherein one capacitive coupling portion includes at least a recessed area.

11. The liquid crystal display of claim 6, wherein a first capacitive coupling portion of the first data line includes a protrusion while a second capacitive coupling portion of the second data line includes a recessed area.

12. A liquid crystal display, comprising:
   a plurality of scan lines and data lines formed over a substrate, wherein the scan lines and data lines define an array of pixels;
   a pixel electrode laid over an area and coupled in each pixel, wherein the pixel electrode has a first side along which runs a first data line and a second side along which runs a second data line; and
   a switch element coupling the pixel electrode with one scan line and the first data line, wherein the switch element is operable to apply a voltage to the pixel electrode in response to scan and data signals delivered through the scan line and first data line;
   wherein the first and second data lines include capacitive coupling portions respectively in proximity of the first and second sides of the pixel electrode, the capacitive coupling portions are entirely located outside the area of the pixel electrode and respectively have a non-rectilinear profile shape dimensionally configured to balance a capacitive coupling between the pixel electrode and the first and second data lines.

13. The liquid crystal display of claim 12, wherein one of the capacitive coupling portions includes a recess.

14. The liquid crystal display of claim 12, wherein one of the capacitive coupling portions includes a projecting portion extending towards the pixel electrode.

* * * * *